United States Patent

Achelpohl

[11] Patent Number: 5,282,778
[45] Date of Patent: Feb. 1, 1994

[54] METHOD FOR MAKING BAGS OF SYNTHETIC MATERIAL

[75] Inventor: Fritz Achelpohl, Lengerich, Fed. Rep. of Germany

[73] Assignee: Windmöller & Hölscher, Lengerich, Fed. Rep. of Germany

[21] Appl. No.: 760,462

[22] Filed: Sep. 17, 1991

[30] Foreign Application Priority Data

Sep. 17, 1990 [DE] Fed. Rep. of Germany ........ 4029440

[51] Int. Cl.⁵ .................. B31B 23/14; B31B 23/64
[52] U.S. Cl. .................................. 493/1; 493/194; 493/203; 493/204; 493/209
[58] Field of Search ............ 493/194, 203, 204, 209, 493/1

[56] References Cited

U.S. PATENT DOCUMENTS

| | | | |
|---|---|---|---|
| 4,195,960 | 4/1980 | Schulze | 493/204 |
| 4,490,207 | 12/1984 | Achelpohl | 493/204 |
| 5,112,289 | 5/1992 | Kohn | 493/194 |
| 5,135,460 | 8/1992 | Feustel | 493/1 |

FOREIGN PATENT DOCUMENTS 297434 1/1989 European Pat. Off. .
3204492 8/1983 Fed. Rep. of Germany .

*Primary Examiner*—William E. Terrell
*Attorney, Agent, or Firm*—Keck, Mahin & Cate

[57] ABSTRACT

A method for making bags of synthetic material in which a tubular foil web of synthetic material is advanced in steps corresponding to the length of one bag. A continuously heated pair (11) of welding jaws grips the tubular foil web (3) of synthetic material prior to cutting and fixes the web in position. The tubular foil web (3) is then cut by means of the transverse cutting knife (10) before the heat of the pair (11) of welding jaws is completely transferred to the tubular foil web (3) of synthetic material. Then the heat is completely transferred to weld the bottom seam of the bag.

1 Claim, 2 Drawing Sheets

METHOD FOR MAKING BAGS OF SYNTHETIC MATERIAL

BACKGROUND OF THE INVENTION

1. Field of the Invention

The invention refers to a method for making bags of synthetic material, in which a tubular foil web of synthetic material is advanced respectively in steps corresponding to the length of one bag and cut by means of a transverse cutting knife, and in which a bottom seam is welded by means of a continuously heated pair of welding jaws.

2. Description of Prior Art

A method of this kind is already known from the German laid-open patent 32 04 492. In accordance with this prior art, the tubular web of synthetic material is slightly stretched after being advanced by one bag length and then is severed by lowering a severing knife holder to which the transverse cutting knife is mounted and which is arranged above the tubular foil web of synthetic material. After severing the web, the latter is gripped by the continuously heated pair of welding jaws arranged in direct vicinity to the transverse cutting knife, and the bottom weld seam is formed. However, in conducting this method it is to be observed that the foils of the tubular foil web of synthetic material, lying on top of each other, are slightly crimpled after being severed by means of the transverse cutting knife so that the foils no longer lie flat on top of each other. When the welding jaws are moved into contact with such crimpled tubular foil web of synthetic material, it is often observed that the bottom seam produced by means of the welding jaws is not perfectly made. It can even happen when one layer of foil is no longer gripped by the welding jaws due to a stronger crimpling effect so that at this place, the formed bottom seam is faulty. But even when the welding jaws grip all layers of the tubular foil web of synthetic material, the quality of the formed bottom weld seam is reduced due to the crimpling.

SUMMARY OF THE INVENTION

It is an object of the invention to further develop a method of the generic type for the production of bags of synthetic material so that the quality of the weld seam can be improved.

According to the invention the continuously heated pair of welding jaws grips the tubular foil web of synthetic material prior to cutting and fixes it. The tubular foil web of synthetic material is then cut by the transverse cutting knife before the heat of the pair of welding jaws is completely transferred to the tubular foil web of synthetic material.

Whereas in previous prior art, the webs were first cut by the knife and only then gripped by the pair of welding jaws. According, to the inventive method the tubular foil web of synthetic material is held by the continuously heated welding jaws..and cut by means of the transverse cutting knife prior to when the heat is completely transferred to the foil due to thermal conduction. The time interval between welding and cutting lies in the range of milliseconds. Directly after cutting the foil, the foil is welded by means of the contacting welding jaws.

According to this method, the heated welding jaws not only have the function of forming the bottom seam of the bag, but prior to the cutting of the bag, there is also carried out an additional holding function by the heated welding jaws.

In this respect, it is surprising to the person having skill in the art that such a holding function can be obtained by the fully heated welding jaws. The person having skill in the art proceeded from the fact that due to its thermoplastic characteristics, the tubular foil web of synthetic material is plasticly deformable due to the heating-up through the welding jaws directly after advancing the welding jaws, i.e. due to the transferred heat, so that a perfect cut by means of the transverse cutting knife is no longer possible. The present invention overcomes said prejudice of the person having skill in the art by making use of the knowledge that within a very short time interval the heat of the fully heated welding jaws is not yet transferred to the foil of synthetic material so that said foil can still be cut within such a time interval.

For the mechanical realization of such short time intervals, the apparatus for carrying out said method is provided with computer controlled stepper motors according to the German laid-open patent 37 21 432, wherein the feed rollers, the pair of welding jaws and the transverse cutting device can each be driven by individual stepper motors, respectively. Advantageously, in this method, the time interval lying in the range of milliseconds between the gripping of the tubular foil web of synthetic material by the pair of welding jaws and the cutting by the transverse cutting knife can be varied.

Embodiments of the invention will now be described in the following with reference to the drawing.

DETAILED DESCRIPTION OF PREFERRED EMBODIMENTS

Figure 1:
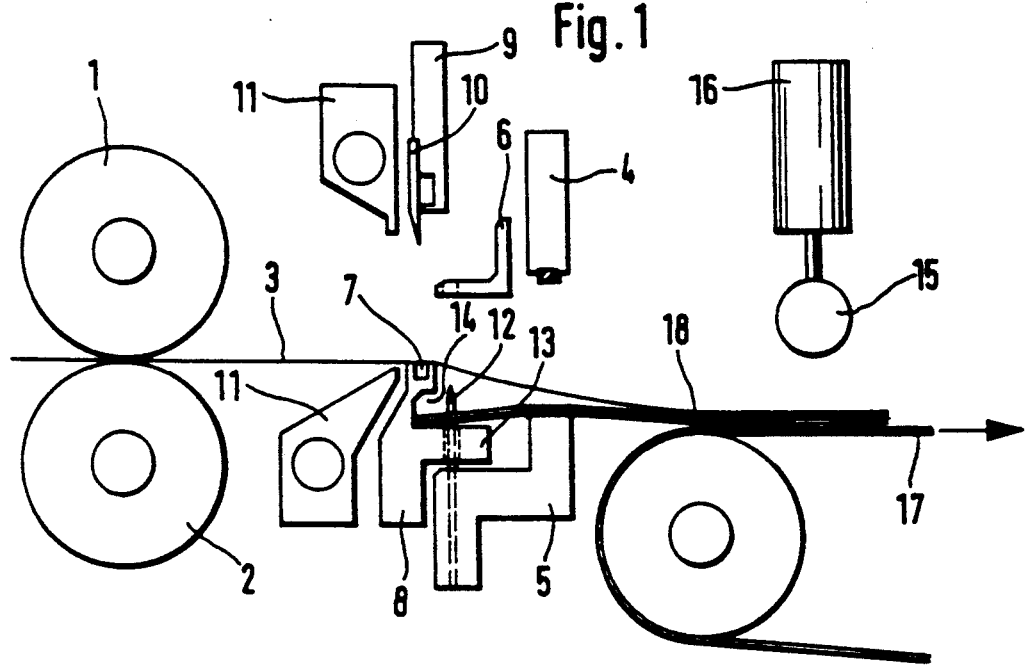
FIG. 1 shows a side view of the transverse welding and transverse cutting device in a schematic representation at a first point of time during conducting the method.
Figure 2:
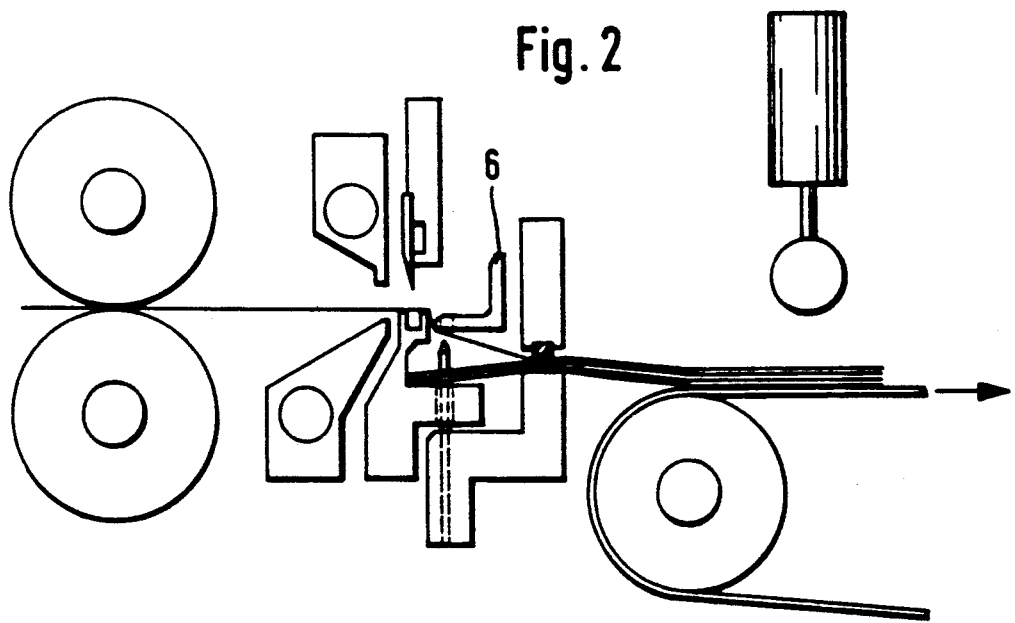
FIG. 2 shows the apparatus according to FIG. 1 at a second point of time of the method, at which the web section clamped between the feed rollers and a pressure bar is stretched by a further pressure bar prior to carrying out the severing cut.

In the apparatus shown in the drawings, the feed rollers 1 and 2 advance the tubular foil web 3 of synthetic material in steps respectively corresponding to one length of a bag and the web is clamped between the feed rollers 1 and 2 to fix the web in position. For advancing the front web end in a stretched form, air blow nozzles (not shown) can be provided. When, by the feed rollers 1 and 2, a sufficiently long piece of the tubular web has been advanced, the holding-down device consisting of the pressure bar 4 is lowered onto an abutment 5 so that the web gets clamped between the abutment 5 and the pressure bar 4 in the manner shown in FIG. 2. Immediately thereafter, the pressure bar 6 is moved out of the position as shown in FIG. 1 into the position as shown in FIG. 2 and thereby presses the web down to such a degree that the web comes to lie over the groove 7 of the counter pressure bar 8 in a stretched manner.

Then the continuously heated welding jaw pair 11 is lowered onto the tubular foil web 3 of synthetic material in a manner not shown so that the web 3 is gripped and fixed by the welding jaw pair 11. Then, within a time interval in the range of milliseconds, the web 3 is severed by lowering the upper severing knife holder 9 with the transverse cutting knife 10 mounted thereon. Since the tubular foil web of synthetic material has already been gripped and fixed prior to the cut by means of the transverse cutting knife 10, the crimpling of the foil ends of the tubular foil web 3 of synthetic material, lying on top of each other, as observed in the conventional method, can be avoided. The feed rollers 1, 2, as well as the welding jaws 11 and the severing knife holder 9 are driven by means of separate computer controlled stepper motors (not shown).

Figure 3:
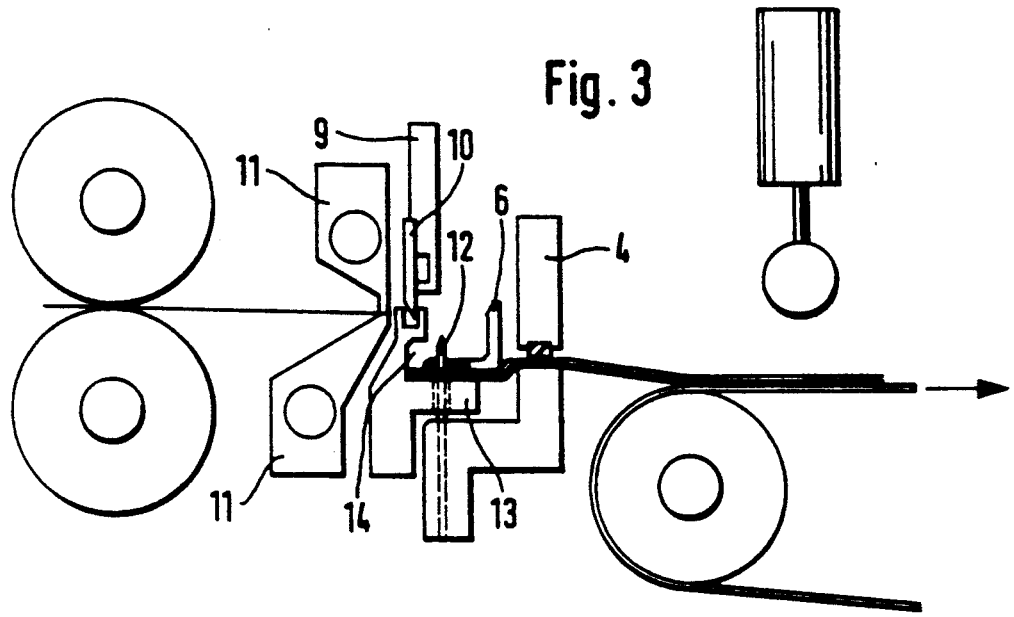
FIG. 3 shows the apparatus according to FIG. 1 with opening edges of the bags needled on the row of needles.
Figure 4:
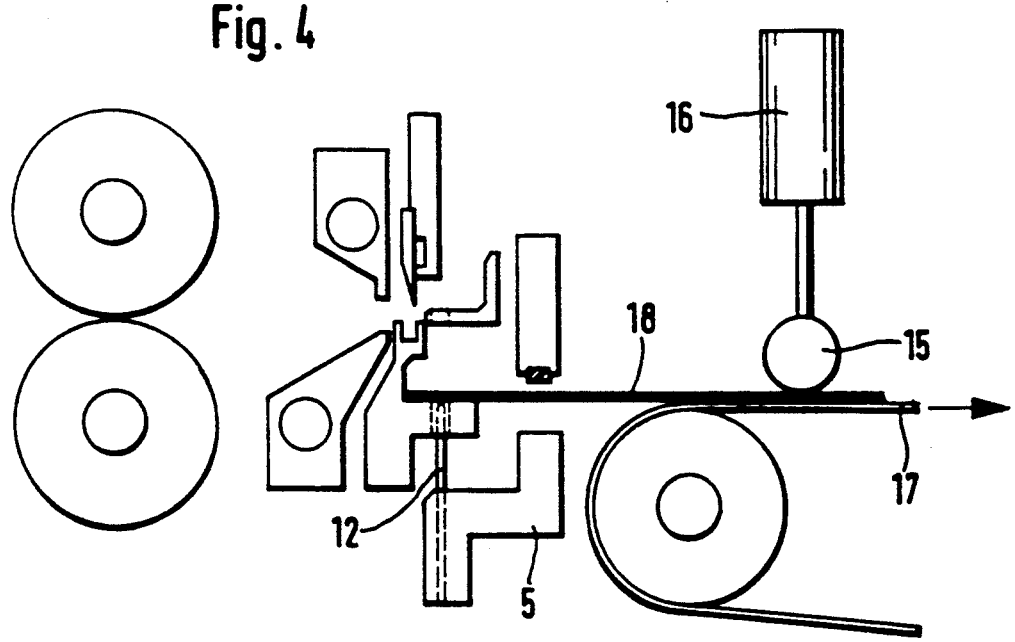
FIG. 4 shows the apparatus according to FIG. 1 at the beginning of the removal of the completed stack after withdrawing the row of needles.

Directly after the cut, the pressure bar 6 moves into the position as shown in FIG. 3 and thereby presses the bag severed from the web onto the supporting bar 13 connected with the counterpressure bar 8. During this operational step, the welding jaws 11 are still closed and the transverse weld seam is formed. The supporting bar 13 has through-bores through which the needles 12 project upwardly so that the severed bag is simultaneously pinned. The needles 12 are fixedly connected to the 90° offset profile of the abutment 5.

Also the pressure bar 6 has bores so that the individual bags can be pushed onto the needles 12 against the supporting bar 13. The indentation 14 under the groove 7 in the counterpressure bar 8 is used for the bulge-free laying down of the bag edges.

From the position as shown in FIG. 3, the single elements move back into the position as shown in FIG. 1 so that the web 3 can be advanced from the feed rollers 1, 2 by a further section length, with the aid of air blow nozzles if necessary, when a sufficient number of bags are stacked, the abutment 5 moves downwardly, the needles 12 being withdrawn from the bag stack. Thereafter, the contacting roller 15, which is controlled via the piston cylinder unit 16, is lowered onto the conveyor belt 17 which is then activated for the removal of the formed stacks 18.

I claim:

1. A method for making bags of synthetic material, comprising the steps of:

advancing a tubular foil web of synthetic material in steps corresponding to the length of one bag, cutting the tubular foil web of synthetic material by means of a transverse cutting knife, and welding of a bottom seam by means of a continuously heated pair of welding jaws, situated adjacent said transverse cutting knife wherein the continuously heated pair of welding jaws and the transverse cutting knife are each driven by separate motors, the motors being computer controlled so that the continuously heated pair of welding jaws grips and fixes the tubular foil web of synthetic material prior to the cutting step, the tubular foil web of synthetic material is cut by means of the transverse cutting knife before the heat of the welding jaw pair is completely transferred to the tubular foil web of synthetic material, and the time interval between the gripping of the tubular foil web of synthetic material by the welding jaw pair and the cutting by the transverse cutting knife can be varied.

* * * * *